A. P. LUNDIN.
CRANE OR DERRICK.
APPLICATION FILED DEC. 29, 1911.
1,207,423.
Patented Dec. 5, 1916.
2 SHEETS—SHEET 2.
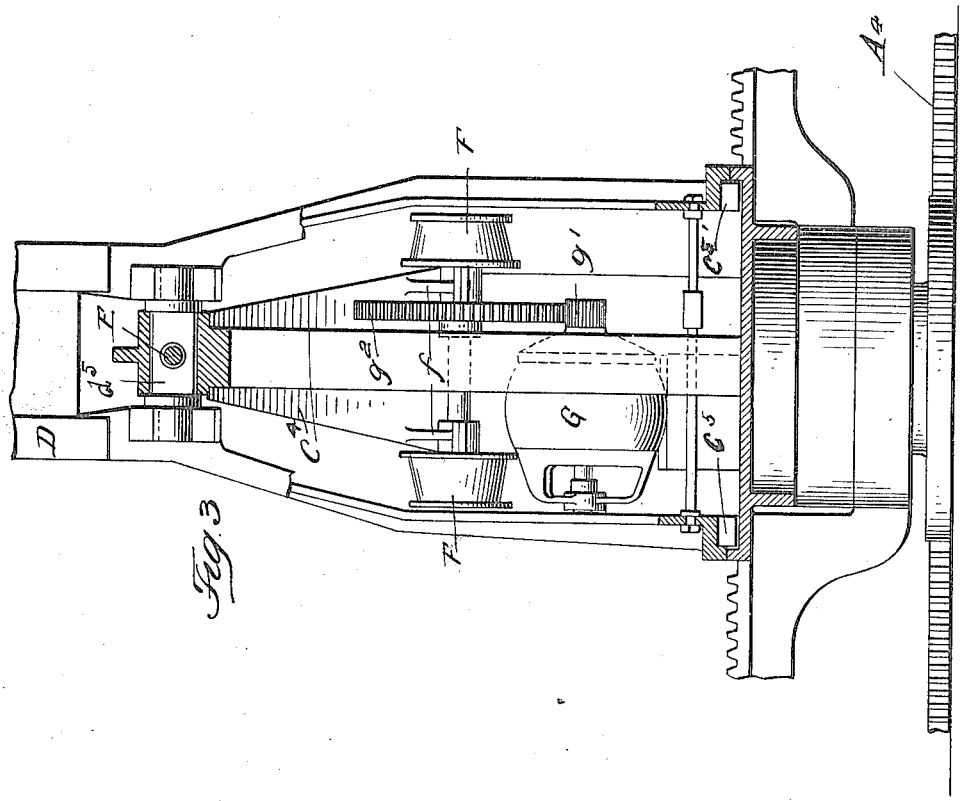
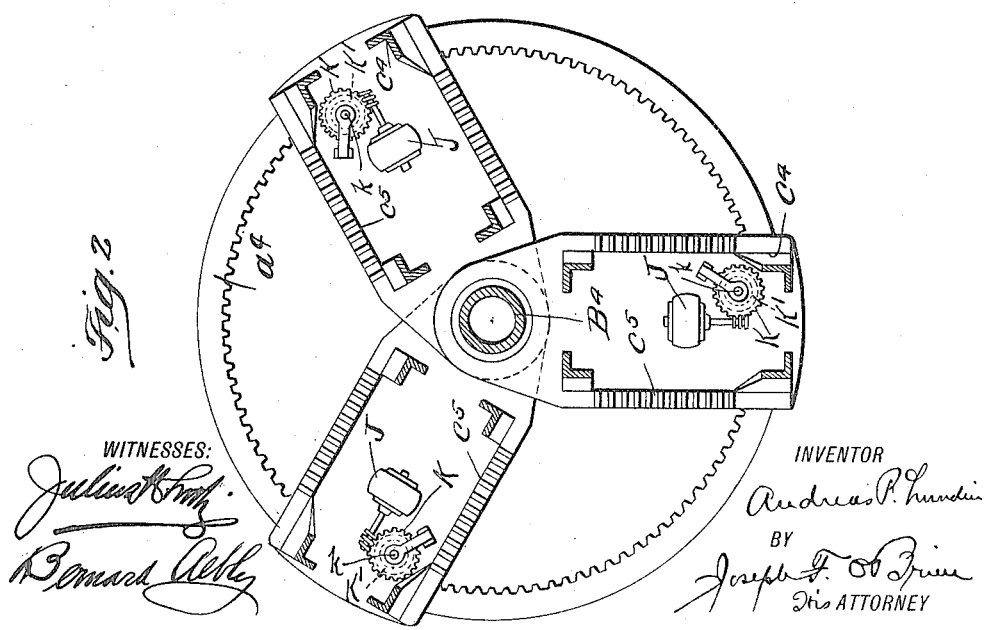

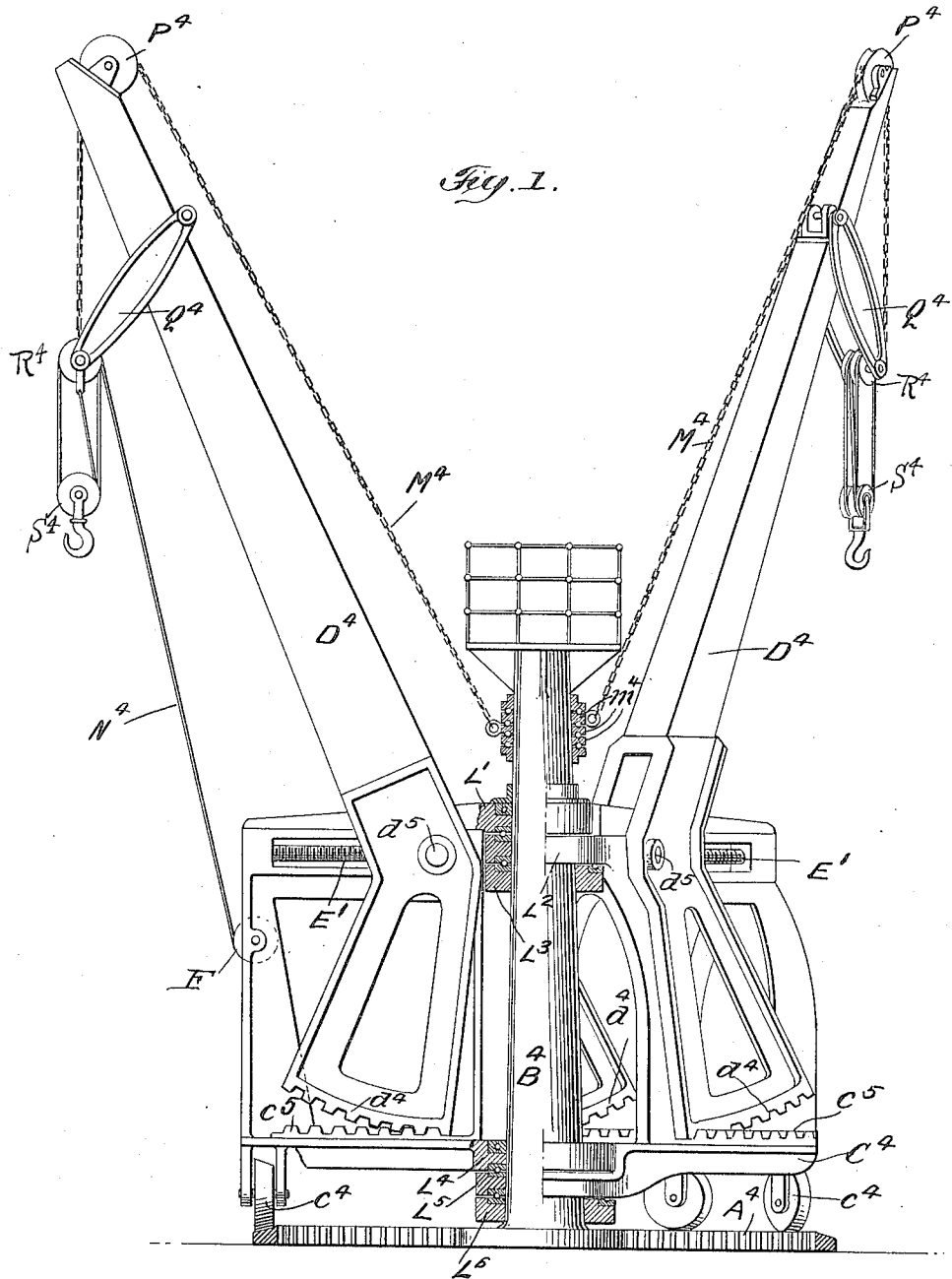

UNITED STATES PATENT OFFICE.

ANDREAS P. LUNDIN, OF NEW YORK, N. Y., ASSIGNOR TO WELIN MARINE EQUIPMENT COMPANY, A CORPORATION OF NEW YORK.

CRANE OR DERRICK.

1,207,423.  Specification of Letters Patent.  Patented Dec. 5, 1916.

Application filed December 29, 1911. Serial No. 668,476.

*To all whom it may concern:*

Be it known that I, ANDREAS P. LUNDIN, a citizen of the United States, and a resident of the borough of Manhattan, city, county, and State of New York, have invented certain new and useful Improvements in Cranes or Derricks, of which the following is a specification.

This invention relates to cranes and is an improvement on the invention disclosed in Letters Patent No. 986,399 granted to me on March 7th, 1911.

By the use of my invention I am enabled to produce a device which may be provided with a plurality of crane-arms or booms and which, while occupying considerably less space than a like number of separate cranes, will be capable of independent operation and sluing and may be used to load or unload a barge or the like and to transport goods to opposite sides thereof, and the loading and unloading may be simultaneously accomplished.

In the accompanying drawings, in which similar reference characters designate corresponding parts throughout the several views, Figure 1 is a side elevation, partly in section, of a form of device embodying my invention; and Fig. 2 is a transverse section of the device illustrated in Fig. 1, the cranes being removed for the purpose of clearness. Fig. 3 is a vertical section to one side of the center of one of the frames shown in Fig. 2.

Referring now to Figs. 1 and 2, three independent frames $C^4$ are mounted to swing pivotally upon a column $B^4$ formed integrally with a base $A^4$, such frames being provided with collars $L^1$—$L^2$—$L^3$—$L^4$—$L^5$—$L^6$ by means of which the three frames are mounted upon the column $B^4$ to rotate independently of each other, ballbearings or other suitable anti-friction devices preferably being employed to permit easy relative movement between the frames. Each of the frames $C^4$ is provided with a pair of racks $c^5$ and also supports a worm $E^4$ to have rotary but not longitudinal movement. A crane-arm $D^4$ is pivoted to a nut $d^5$ threaded on each of the worms $E^4$. The frames $C^4$ are also provided with wheels $c^4$ running upon the base $A^4$. Load supporting rope $M^4$ is connected to a collar $m^4$ journaled on the column $B^4$ by means of ball bearings or other suitable anti-friction devices and adapted to rotate thereabout. The opposite ends of each of the ropes $M^4$ are led upwardly over pulleys $P^4$ on each crane-arm and are connected at their other ends to the outer ends of the gaffs $Q^4$. Suitable pulleys $R^4$ are mounted at the outer end of the gaff $Q^4$ and a hoisting rope $N^4$ is secured at one end contiguous to said pulley $R^4$, is led downwardly over one of the pulleys in a block $S^4$ to which the securing hook is connected, is then led upwardly over one of the pulleys $R^4$, thence downwardly over the other pulley in the block $S^4$ and again upwardly over the other of the pulleys $R^4$ at the outer end of the gaff and thence downwardly to hoisting drums F, which drums are mounted on a common shaft and are supported by brackets $f$. Said drums are rotated as shown by a motor G geared to the shaft thereof by means of gears $g'$ $g^2$.

It will be obvious that motors or other suitable means may be employed to swing the crane arms vertically and to swing the frames horizontally around the column or pivot. As illustrated, I provide a motor J supported on each frame, which motor rotates pinion K, shaft $k$ and pinion K' which meshes with the internal gear $a^4$, the said pinion K' being shown in dotted lines. A screw E' may be rotated to swing the crane arm vertically by any suitable or convenient means.

Having described my invention, I claim:

1. A crane construction embodying therein a suitable base, a pivot, a circular track around said pivot, a plurality of cranes each having an independent connection with the pivot and an independent bearing on said track, a crane arm in each of the frames supported to swing vertically, means for swinging each of the crane-arms vertically independently of the other and means for independently sluing each of the frames.

2. A crane construction embodying therein a pivotal column, a base, a circular track around said pivotal column, a plurality of frames each having an independent anti-friction connection with said column and an independent anti-friction bearing on said track, a crane arm in each frame supported to swing vertically, means for swinging the crane arm vertically and means for independently sluing the frames.

In witness whereof, I have signed my name to the foregoing specification in the presence of two subscribing witnesses.

ANDREAS P. LUNDIN.

Witnesses:
FREDERICK P. RANDOLPH,
JOSEPH F. O'BRIEN.

Copies of this patent may be obtained for five cents each, by addressing the "Commissioner of Patents, Washington, D. C."